United States Patent
Paridon et al.

(10) Patent No.: US 8,138,267 B2
(45) Date of Patent: Mar. 20, 2012

(54) POLYOLEFIN COMPOSITIONS AND DRAWN TAPES, FIBRES AND FILAMENTS PRODUCED THEREFROM

(75) Inventors: Henk Van Paridon, Averbode (BE); Bert Broeders, Heusden (BE)

(73) Assignee: Borealis Technology Oy (FI)

( * ) Notice: Subject to any disclaimer, the term of this patent is extended or adjusted under 35 U.S.C. 154(b) by 21 days.

(21) Appl. No.: 12/733,085

(22) PCT Filed: Aug. 6, 2008

(86) PCT No.: PCT/EP2008/060312
§ 371 (c)(1),
(2), (4) Date: Feb. 5, 2010

(87) PCT Pub. No.: WO2009/019280
PCT Pub. Date: Feb. 12, 2009

(65) Prior Publication Data
US 2010/0152391 A1    Jun. 17, 2010

(30) Foreign Application Priority Data
Aug. 9, 2007   (EP) ..................................... 07114113

(51) Int. Cl.
*C08F 8/00* (2006.01)
*C08L 23/00* (2006.01)
*C08L 23/04* (2006.01)
*C08L 23/10* (2006.01)

(52) U.S. Cl. ...................................... 525/191; 525/240

(58) Field of Classification Search .................. 525/191, 525/240
See application file for complete search history.

(56) References Cited

U.S. PATENT DOCUMENTS

| 3,300,459 A | 1/1967 | Natta et al. |
| 4,508,872 A | 4/1985 | McCullough |
| 5,468,809 A * | 11/1995 | Ghisellini et al. ............ 525/240 |
| 5,919,877 A | 7/1999 | Tanaglia |

FOREIGN PATENT DOCUMENTS

| EP | 0 060 090 A1 | 9/1982 |
| EP | 1 452 630 A1 | 9/2004 |
| WO | WO9707274 | 2/1997 |
| WO | WO2009/019280 A1 | 2/2009 |

OTHER PUBLICATIONS

"Ethylene polymers, HDPE" in Encyclopedia of Polymer Science and Technology (@2002 by John Wiley & Sons, Inc.), pp. 385-391 and 401-404.

* cited by examiner

*Primary Examiner* — Nathan M Nutter
(74) *Attorney, Agent, or Firm* — Warn Partners, P.C.

(57) ABSTRACT

The invention relates to a novel polyolefin composition which is suitable for producing drawn tapes, fibres and filaments which have improved mechanical properties. The composition comprises A) 2 30 wt % of a propylene copolymer which comprises a a) random propylene copolymer having a content of ethylene and/or C 4-C 8a-olefin of 0.5 to 12 wt % and optionally an b) ethylene-a-olefin rubber, B) 70 98 wt % of a high density polyethylene having a density of 930 to 965 kg/m3 and a MFR (190° C./2.16 kg) of 0.3 to 20 g/10 min.

16 Claims, 3 Drawing Sheets

POLYOLEFIN COMPOSITIONS AND DRAWN TAPES, FIBRES AND FILAMENTS PRODUCED THEREFROM

This application is a National Stage of International Application No. PCT/EP2008/060312, filed Aug. 6, 2008. This application claims priority to European Patent Application No. 07114113.9 filed on Aug. 9, 2007. The disclosures of the above applications are incorporated herein by reference.

The present invention relates to a novel polyolefin composition which is suitable for producing drawn tapes, fibres and filaments which have improved mechanical properties.

Polyethylene is one of the materials used for the production of stretch tapes and monofilaments. The applications for tape and monofilaments are ranging from nets and ropes for marine, fishing and agricultural applications, geotextiles, nets for packaging and several other applications.

Higher drawability and tenacity will allow to develop new applications and will allow down gauging.

Improving the mechanical properties of polypropylene tapes and monofilaments by blending in polyethylene is well known and often applied.

However, improving the properties of polyethylene tapes and monofilaments by blending in polypropylene is rather unknown. Some experience does exist in the form of tapes produced from blends of polyethylene with a minor amount of propylene homopolymer. The problem however is, that in these blends the film appearance is poor.

OBJECT

It is the object of this invention to provide novel polyolefin compositions, where drawn tapes, fibres and filaments made from these polyolefin compositions have an improved mechanical performance compared to tapes, fibres and filaments made from the basic ethylene polymer. Particularly, it is desirable that the tapes, fibres and filaments either have an improved elongation at break or an improved tenacity compared to the respective fibre, tape or filament made from the basic ethylene polymer. It is particularly preferred, that at least the elongation at break is improved compared to the basic ethylene polymer. It is especially preferable that both the elongation at break and the tenacity are improved compared to the respective fibre, tape or filament made from the basic ethylene polymer.

The above mentioned problem is solved by blending a small amount of a propylene copolymer with a high density polyethylene. Tapes and monofilaments made from such a composition have a higher drawability and an improved tenacity-elongation balance.

More particularly, the aforementioned object is achieved with a polyolefin composition comprising A) 2-30 wt % of a propylene copolymer which comprises a
   a) random propylene copolymer having a content of ethylene and/or $C_4$-$C_8$ α-olefin of 0.5 to 12 wt % and optionally an
   b) ethylene-α-olefin rubber, B) 70-98 wt % of a high density polyethylene having a density of 930 to 965 kg/m$^3$ and a MFR (190° C./2.16 kg) of 0.3 to 20 g/10 min.

Generally, the amount of propylene copolymer in the polyolefin composition of the invention ranges from 2-30 wt %, preferably from 3-25 wt % and more preferably from 5-20 wt %. A necessary component of the propylene copolymer is a random propylene copolymer.

A random propylene copolymer according to the present invention is a random propylene-copolymer produced by statistical insertion of units of ethylene and/or $C_4$-$C_8$ α-olefins.

As comonomers the random propylene copolymer according to the present invention may contain ethylene and/or one or more $C_4$-$C_8$ α-olefins. Suitable α-olefins may be linear or branched. Preferred α-olefins are 1-butene, 1-hexene, 1-octene and 4-methyl-1-pentene. Ethylene and 1-butene are especially preferred as comonomers.

According to the invention, it is preferred that the random propylene copolymer either is a binary copolymer of propylene with ethylene or a binary copolymer of propylene with 1-butene or a terpolymer of propylene with ethylene and 1-butene.

According to the present invention the used random copolymer preferably has a comonomer content of 0.5 to 12 wt %, preferably 1 to 11 wt %.

For a binary copolymer of propylene with ethylene the preferred comonomer content is 0.5 to 8 wt %, more preferably 1 to 7 wt %, even more preferably 2 to 6 wt %.

For a binary copolymer of propylene with 1-butene the preferred comonomer content is 0.5 to 10 wt %, more preferably 1 to 9, even more preferably 2 to 8 wt %.

For a terpolymer of propylene with ethylene and 1-butene the total comonomer content preferably is 0.5 to 16 wt %, more preferably 1 to 13 wt %, even more preferably 2 to 10 wt %. For a terpolymer the ethylene content is preferably smaller than the 1-butene content and the preferred ratio of ethylene content to 1-butene content is $\leq 0.5$, more preferable $\leq 0.3$. Further, for a terpolymer of propylene with ethylene and 1-butene the preferred content of ethylene is from 0.3-3 wt % and the preferred 1-butene content is from 0.7-15 wt %.

According to an optional embodiment the propylene copolymer used in the present invention comprises an ethylene-α-olefin rubber.

It has surprisingly been found that compositions where the propylene copolymer comprises a random propylene copolymer and an ethylene-α-olefin rubber also show a level of mechanical properties which—on average—are improved compared to compositions containing no modifier or a propylene homopolymer as modifier.

The ethylene-α-olefin rubber which is used according to the present invention may comprise any $C_3$-$C_8$ α-olefin, for example propylene, 1-butene, 1-hexene, 1-octene or more than one $C_3$-$C_8$ α-olefin.

Preferably the ethylene-α-olefin rubber is an ethylene-propylene rubber (EPR). Compared to other ethylene-α-olefin rubbers, EPRs have the advantage that they are more cost-effective than ethylene rubbers with higher α-olefins and they can either be synthesised in the latter step(s) of a multistage process, where in the first step(s) the random copolymer is synthesised or, alternatively, EPR's can be polymerised separately and mixed with the random copolymer and/or the HDPE component in a separate melt blending step.

A further parameter to characterise the propylene copolymers used for the present invention is their content soluble in xylene at room temperature (XS content).

For a random propylene copolymer it is preferred that the XS content is $\leq 12$ wt %, more preferably $\leq 10$ wt % and still more preferably $\leq 8$ wt %. Preferred lower amounts for the XS contents are $\geq 2$ wt % and more preferably $\geq 3$ wt % and still more preferably $\geq 4$ wt %. The aforementioned XS contents are particularly preferred when the random propylene copolymer is a binary propylene-ethylene random copolymer.

For those embodiments of the present invention where the propylene copolymer comprises both a random propylene copolymer as well as an ethylene-α-olefin rubber it is preferred that the XS content of the propylene copolymer is from 15-50 wt %, more preferably from 15-40 wt % and still more preferably from 15-35 wt %. The aforementioned XS contents are particularly preferred when the random propylene copolymer is a binary propylene-ethylene random copolymer and the ethylene-α-olefin rubber is an ethylene-propylene rubber.

Further, for those embodiments of the present invention where the propylene copolymer comprises both a random propylene copolymer as well as an ethylene-α-olefin rubber, it is preferred that amount of ethylene-α-olefin rubber is from 8-35 wt % based on the total weight of the propylene copolymer, more preferably 10-30 wt %, still more preferably 12-25 wt %. The aforementioned amounts of ethylene-α-olefin rubber are particularly preferred when the random propylene copolymer is a binary propylene-ethylene random copolymer and the ethylene-α-olefin rubber is an ethylene-propylene rubber.

For those embodiments of the present invention where the propylene copolymer comprises both a random propylene copolymer as well as an ethylene-α-olefin rubber, it is preferred that the propylene copolymer has an ethylene content of from 6-30 wt %, more preferably from 8-25 wt %, still more preferable from 9-20 wt %. Again, the mentioned ranges are particularly preferred when the random propylene copolymer is a binary propylene-ethylene random copolymer and the ethylene-α-olefin rubber is an ethylene-propylene rubber.

For the propylene copolymer which is used in the present invention it is advantageous when its fluidity (expressed as MFR) is within a certain range. It is thus preferred that the MFR of the propylene copolymer has an MFR (230° C., 2.16 kg) of 0.5 to 10 g/10 min. Preferred MFR values for the propylene copolymer are from 0.5-8 g/10 min, particularly preferred are 0.5-5 g/10 min.

The main component of the polyolefin composition of the invention is a high density polyethylene (HDPE).

Generally, the amount of HDPE in the polyolefin composition according to the invention ranges from 70-98 wt %, preferably 75-97 wt %, more preferably 80-95 wt %.

The HDPE which is used according to the present invention may either be a homopolymer or an ethylene-α-olefin copolymer. When an ethylene-α-olefin copolymer is used, the α-olefin preferably is an α-olefin having from 3 to 20 carbon atoms, more preferably from 4 to 10 carbon atoms, still more preferably from 4 to 6 carbon atoms. Examples of suitable α-olefins are propylene, 1-butene, 1-hexene and 1-octene. Preferred are 1-butene and 1-hexene, especially preferred is 1-hexene.

Generally, the amount of α-olefin contained in the ethylene-α-olefin copolymer in accordance with the present invention amounts to about 0.2 to 8 wt %, preferably 0.4 to 4 wt %, and more preferably 0.6 to 3.0 wt %. An especially preferred α-olefin content is in the range of from 0.6 to 2 wt %. The aforementioned concentration ranges are especially preferred when the comonomer is 1-hexene. For 1-hexene an even more preferred content is 0.7-1.5 wt %, particularly 0.7-1.0 wt %.

Generally, the density of the HDPE of the polyolefin composition according to the present invention is between 930 to 965 kg/m$^3$, preferably from 935-955 kg/m$^3$ and more preferably from 940-950 kg/m$^3$. The aforementioned densities are especially preferred when the comonomer is 1-hexene. For 1-hexene as comonomer an even more preferred density is 942-950 kg/m$^3$, particularly 945-950 kg/m$^3$.

The HDPE generally has an MFR (190° C./2.16 kg) of from 0.2-15 g/10 min, preferably of from 0.4-12 g/10 min and more preferably of from 0.5-10 g/10 min, such as about 0.6 g/10 min.

The HDPE preferably is a mono-modal polymer with respect to the molecular weight distribution showing a rather narrow molecular weight distribution (MWD) $M_w/M_n$ of ≧2 preferably from 2 to 8, more preferably 2 to 5, even more preferably 3.5 to 4.5, such as about 4.

Generally, HDPE with a rather narrow MWD as outlined above and as used in the present invention is preferred for stretching, because narrow-MWD HDPE has a better stretchability than HDPE with broad MWD ($M_w/M_n$ of >8, especially >10). A direct result of this better stretchability are better mechanical properties, i.e. the achievable maximum tenacity is lower for fibres from broad-MWD HDPE.

The (HDPE) to be employed in accordance with the present invention may be prepared using conventional polymerization techniques, in particular employing Ziegler-Natta catalysts. Suitable polymerization conditions and catalysts are known to the skilled person.

Production of Polymers
Production of Random Propylene Copolymers

The polymerisation process for the production of the random propylene copolymers according to the invention may be a continuous process or a batch process utilising known methods and operating in liquid phase, optionally in the presence of an inert diluent, or in gas phase or by mixed liquid-gas techniques.

Accordingly, the random propylene copolymer may be produced by single- or multistage process polymerisation of propylene and α-olefin and/or ethylene such as bulk polymerisation, gas phase polymerisation, slurry polymerisation, solution polymerisation or combinations thereof using conventional catalysts. Preferably, the copolymer is made either in one or two loop reactor(s) or in a combination of loop and gas phase reactor. Those processes are well known to one skilled in the art.

The process is preferably carried out in the presence of a stereospecific catalyst system.

A suitable catalyst for the polymerisation of the propylene polymer is any stereospecific catalyst for propylene polymerisation which is capable of polymerising and copolymerising propylene and α-olefin-comonomers at a temperature of 40 to 110° C. and at a pressure from 10 to 100 bar. Ziegler Natta catalysts as well as metallocene catalysts are suitable catalysts.

One skilled in the art is aware of the various possibilities to produce random propylene copolymers and will simply find out a suitable procedure to produce suitable polymers which are used in the present invention.

As Ziegler-Natta catalyst any ordinary stereospecific Ziegler-Natta catalysts can be used. An essential component in those catalysts are solid catalyst components comprising a titanium compound having at least one titanium-halogen bond, an internal electron donor compound and a magnesium halide in active form as a carrier for both the titanium component and the donor compound. The catalysts can contain—as internal electron donor—compounds selected from ethers, ketones, lactones, compounds containing N, P and/or S atoms and esters of mono and dicarboxylic acids. Preferred are aromatic esters like benzoates or phthalates, e.g. ethyl benzoate or, diisobutylphtalat, or diethers like 2,2-diisopropyl-1, 3-dimethoxypropene.

A further essential component of the catalyst is a cocatalyst, an organoaluminium compound, such as an alkylaluminium compound, preferably triethyl-aluminium (TEN) or tri-isobutyl-aluminium.

Additionally, an external electron donor is generally used. Preferred are external donors according to the formula wherein R and R' are identical or different and are branched or cyclic aliphatic or aromatic hydrocarbon residues, and y and x independently from each other are 0 or 1, provided that x+y are 1 or 2.

Particularly preferred external donors are dicyclopentyldimethoxysilane and cyclohexyldimethoxymethylsilane.

To obtain the random propylene copolymer, it is preferred to use a polymerisation process based on a first polymerisation step in at least one slurry reactor and an optional second polymerisation step preferably comprising at least one gas phase reactor. Preferred slurry reactors are loop reactors.

Preferred reactor arrangements for producing the random propylene copolymer are a single loop reactor or two consecutive loop reactors or a loop reactor followed by a gas phase reactor.

Before the catalyst system is used in the actual polymerisation process it is optionally pre-polymerised with small amounts of α-olefins, preferably propylene, in order to enhance catalyst performance and to improve the morphology of the end product.

In the first polymerisation step of the process the optionally prepolymerised catalyst system and a monomer feed comprised of propylene, and one or more of ethylene and/or $C_4$-$C_8$ α-olefins is fed into a reactor. Preferably, the $C_4$-$C_8$ α-olefin can be any one or mixtures of 1-butene, 4-methyl-1-pentene, 1-hexene or 1-octene. Particularly preferred are ethylene and 1-butene. The amount of comonomer in the feed can be up to 40 wt %.

Polymerisation can be carried out in the presence of the previously mentioned organoaluminium compound and an external donor compound at temperatures lower than 110° C. and pressures in the range of 10 to 100 bar, preferably 30 to 70 bar. The polymerisation is carried out in such conditions that 50 to 100 wt %, preferably 75 to 99 wt % of the end product is polymerised in the first reactor.

Any metallocene catalyst capable of catalysing the formation of a propylene polymer can also be used. A suitable metallocene catalyst comprises a metallocene/activator reaction product, which is typically impregnated in a porous support at maximum internal pore volume. The catalyst complex comprises a ligand which is typically bridged, and a transition metal of group IVa . . . . VIa, and an organoaluminium compound. The catalytic metal compound is typically a metal halide, e.g. $ZrCl_2$.

In the first polymerisation step a polymer is produced, in which the content of comonomer is in the range of up to 18.0 wt %, preferably up to 10 wt %. Hydrogen is added, when desired, into the first reactor for adjusting the molecular weight of polymer, as conventional.

After the polymerisation is complete in the first reactor, the reaction medium is optionally transferred into a second reactor, which can be a gas phase reactor. If the second reactor is also a loop reactor, the same range of polymerisation conditions is available as for the first reactor.

In the optional second reactor, 0 to 50 wt %, preferably 1 to 25 wt % of the final polymer is formed. In the second reactor, if it is a gas phase reactor, the polymerisation can be carried out at a temperature of 60 to 90° C. and at a pressure higher than 5 bar, preferably higher than 10 bar. Optionally, propylene and other monomers can be added into the second reactor. Hydrogen can also be added into the gas phase reactor, if desired.

The precise control of the polymerisation conditions and reaction parameters is within the state of the art. After the polymerisation in the first and the optional second reactor is finished, the polymer product is recovered by conventional procedures.

The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents, etc.

Production of Ethylene-Propylene Rubber (EPR)

An ethylene propylene rubber may be produced by known polymerisation processes such as solution, suspension and gas-phase polymerisation using conventional catalysts. Ziegler Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene rubber is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Alternatively, ethylene-propylene rubbers, which are commercially available and which fulfil the indicated requirements, can be used.

The propylene copolymers according to the present invention can be conveniently produced by a) combining the random propylene copolymer in the form of powder or granules with ethylene-propylene rubber and optionally additional additives in a melt mixing device and melting, homogenising and pelletising the blend. Melt mixing devices suited for this process are discontinuous and continuous kneaders, twin screw extruders and single screw extruders with special mixing sections and co-kneaders. The residence time must be chosen such that a sufficiently high degree of homogenisation is achieved.

b) subsequent polymerisation of the EPR after the polymerisation of the random propylene copolymer in a multistage process. Such a material is called random heterophasic copolymer (RAHECO). The latter is described in the following section:

Production of RAHECO

The production of a RAHECO begins with the production of a random propylene copolymer, which is already described above.

Accordingly, for the production of a RAHECO it is preferred to use a multistage polymerisation process which utilises, firstly, a reactor setup as outlined above, i.e. a polymerisation process based on a first polymerisation step in at least one slurry reactor and an optional second polymerisation step preferably comprising at least one gas phase reactor, for producing the random propylene copolymer, and, secondly, at least one additional polymerisation step(s) in one or more gas phase reactors.

A preferred reactor setup is a combination of bulk slurry loop reactor(s) and gas phase reactor(s), particularly one loop reactor and one gas phase reactor (random copolymer in loop and EPR in gas phase) or two loop reactors and one or two gas phase reactors (random copolymer in loops and EPR in gas phases) or one loop and two gas phases (random copolymer in loop and EPR in gas phases or random copolymer in loop and first gas phase and EPR in second gas phase) or one loop and three gas phases (random copolymer in loop and first gas phase and EPR in second and third gas phases).

The produced random copolymer is transferred into a gas phase reactor, where EPR is produced, afterwards the product is optionally transferred into a further gas phase reactor, where an optional further (or final) part of the EPR is produced.

The monomer feed (especially ethylene) to the gas phase reactor(s) where the EPR is produced is adjusted such that the final ethylene content of the RAHECO is between 6-30 wt %. Further, the monomer feed (especially ethylene) to the gas phase reactor(s) where the EPR is produced is adjusted such that the final ethylene content of the EPR is from 20-80 wt %, preferably 30-70 wt %, more preferably 40-60 wt %.

After the polymerisation is finished, the polymer product (RAHECO) is recovered by conventional procedures. The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents.

Production of HDPE

The ethylene homo- or copolymers which are used in accordance with the present invention are produced by a single- or multistage process by polymerisation of ethylene, optionally with $C_3$-$C_{20}$ α-olefins, preferably 1-butene, 1-hexene or 1-octene, as comonomers for density regulation. The different stages can be carried out in liquid phase using suitable diluents and/or in gas phase at temperatures of 40-110° C. and pressures of 10 to 100 bar. The various possibilities for the production of HDPE and suitable catalysts therefor are described in detail in "Ethylene polymers, HDPE" in *Encyclopedia of Polymer Science and Technology* (© 2002 by John Wiley & Sons, Inc.), pages 385-391 and 401-404, the disclosure of which is incorporated herein by reference.

Fibre Preparation

The polyolefin composition as defined above or below, typically in the form of pellets, is converted to fibres of the invention in a manner well known and documented in the art. The term "fibre" as used herein is meant to encompass fibres, stretch tapes, filaments and monofilaments alike. Particularly, when the term "fibre" is used alone, it is not to be understood so as to exclude any of the embodiments mentioned before.

The fibres can preferably be produced via a film extrusion process, such as cast film or blown film process, followed by film slitting to produce i.a. tapes, or via a direct extrusion process to produce filaments, preferably monofilaments.

Before producing the fibres of the invention, the different polymer components are typically intimately mixed prior to extrusion as is well known in the art.

According to one commonly used alternative, the polyolefin composition according to the invention can be extruded into fibres, tapes or filaments, preferably monofilaments, using know filament extrusion process. One suitable process for producing the fibres of the invention is described in "Fiber Technology" Hans A. Krässig, Jürgen Lenz, Herman F. Mark; ISBN: 0-8247-7097-8.

In a second commonly used alternative, the polyolefin composition according to the invention are extruded into a film which is subsequently cut into fibres and tapes in a known manner. Both preparation methods are conventional and generally known in the production of fibres, tapes and filaments.

As to the fibre preparation process wherein a film is first formed and then cut into fibres or tapes: The film may be prepared by any conventional film formation process including extrusion procedures, such as cast film or blown film extrusion, lamination processes or any combination thereof. The film may be a mono or multilayer film, e.g. a coextruded multilayer film. In case of a multilayer film, the film layers may comprise the same or different polymer composition, whereby at least one layer comprises the polyolefin composition according to the invention. Preferably, all layers of a multilayer film comprise, more preferably consist of, the same polyolefin composition according to the invention.

Particularly preferably the film is formed by blown film extrusion and in case of multilayered film structure by blown film coextrusion processes. Typically the polyolefin composition may be blown (co)extruded at a temperature in the range 160° C. to 240° C., and cooled by blowing gas (generally air) at a temperature of 10 to 50° C. to provide a frost line height of 1 or 2 to 8 times the diameter of the die. The blow up ratio should generally be less than 6, less than 4, more preferably between 1.0 to 1.5, and even more preferably 1.0 to 1.2.

The film may also be (co)extruded to form first a bubble which is then collapsed and cooled, if necessary, and the obtained tubular film is cut into fibres. Alternatively, the (co)extruded bubble may be collapsed and split into two film laminates. The formed film is then cut to fibres.

Alternatively, fibres can be cut from a cast film that is produced by procedures well known in the field.

In a very preferable embodiment of the invention fibres are in a stretched, i.e. oriented, form. In that case the fibres are preferably stretched uniaxially, more preferably in machine direction (MD). Accordingly, in the first direct filament formation alternative, said fibres can be stretched to a desired draw ratio after extrusion to filaments. In the second fibre preparation alternative, wherein a film is first formed and cut to fibres, said film can be stretched before cutting to stretched fibres, e.g. tapes, or the film is first cut e.g. to tapes and then the formed tapes are stretched to form the final fibres. Preferably the film is first cut e.g. into tapes which are then stretched to a desired draw ratio to form the final fibres. As to preparation of fibres by first forming a film and cutting it into fibres and tapes, reference can be made to the known Lenzing process (for stretching a film prior to cutting into tapes) and Iso process (for cutting a film into tapes and stretching the formed tapes).

As a preferred embodiment thus stretched fibres are provided which are preferably in stretched, i.e. oriented, form, preferably in uniaxially oriented form.

Heat may typically be applied during the stretching, e.g. during in line stretching. The stretching ratio can be determined e.g. by the speed ratio of the godet rolls before and after the heating means in a manner known in the art. As also well known, the stretch and heat setting ratio's can be optimised and adapted depending on the demands of the end application. As heating means e.g. oven or hot plate can be used.

Accordingly, the fibre preparation process preferably comprises a step of stretching extruded filaments, of stretching fibres/tapes cut from a film, or of stretching film prior to cutting into fibres/tapes, whereby the stretching is preferably effected in the machine direction (MD) in a draw ratio of at least 1:3.

A preferable fibre preparation process thus comprises a step of extruding the polyolefin composition into a fibre which is optionally stretched, preferably in MD, at least 3 times its original length, or a film which is optionally stretched, preferably in MD, at least 3 times its original length and subsequently cut into fibres, or which film is first cut into fibres which are optionally stretched, preferably in MD, at least 3 times their original length.

More preferably, extruded fibres, fibres/tapes cut from a film or a film prior to cutting into fibres/tapes is/are stretched 3 to 10 times, its/their original length in the MD. The expressions "stretching 3 times its/their original length" and "drawn down to 3 times its/their original length" mean the same and can also be expressed as a "stretch ratio of at least 1:3" and, respectively, "draw ratio of at least 1:3", wherein "1" represents the original length of the film and "3" denotes that it has been stretched/drawn down to 3 times that original length. Preferred films of the invention are stretched in a draw ratio of at least 1:4, more preferably in the range of 1:5 to 1:8, e.g. in a draw ratio of between 1:5 and 1:7. An effect of stretching, i.e. drawing, is that the thickness of the film is similarly reduced. Thus a draw ratio of at least 1:3 means preferably that also the thickness of the film is at least three times less than the original thickness.

The fibres can then be further processed to articles such as ropes, twines, nets, bags or textiles for technical and agricultural use.

Measurement and Determination Methods

MFR

MFR's were determined according to ISO 1133 at 230° C. with a load of 2.16 kg for polypropylene and at 190° C. with a load of 2.16 kg for polyethylene.

Comonomers

Comonomer contents were measured with Fourier transform infrared spectroscopy (FTIR) calibrated with $^{13}$C-NMR.

Density

Determined according to ISO 1183 on compression moulded specimens, which were prepared at 220° C. in a cavity having the dimensions 240×240×4 mm according to the following procedure:
  amount of resin is calculated using the cavity volume+ additional 10% of the cavity volume.
  melt time from room temperature to 220° C.: 10 min
  pressure was used in three steps (25/50/75 bar); 1 minute to reach 75 bar
  press time at 220° C./75 bar: 5 min
  cool down velocity 15° C./min
  Samples having the dimensions 80×10×4 mm were cut from the compression molded specimen.
  The samples were tested after 96 h.

Xylene Solubles (XS) Content:

For the determination of the XS fraction, 2.0 g of polymer is dissolved in 250 ml of p-xylene at 135° C. under stirring. After 30±2 min the solution is allowed to cool for 5 min at ambient temperature and then allowed to settle for 30 min at 23±0.5° C. The solution is filtered with a paper filter into two 100 ml flasks. The solution in the first 100 ml flask is evaporated in nitrogen flow and the residue is dried under vacuum at 90° C. until constant weight is reached. The xylene soluble (XS) fraction is then calculated using the following equation:

$$XS[\%]=(100 m_1 v_0)/(m_0 v_1)$$

wherein $m_0$ is the initial polymer amount [g], $m_1$ is the weight of the residue [g], $v_0$ is the initial volume [ml] and $v_1$ the volume of the analysed sample [ml].

Linear Density

Linear density of the stretched fibres was determined according to ISO 2060:1994, Option 1 at 23° C. and 50% rel. humidity.

Tensile Properties

Tensile properties (maximum force at break and elongation at break) of the stretched fibres were determined according to EN 13895:2003 at 23° C. and 50% rel. humidity.

Tenacity

Tenacity at break was calculated by dividing the maximum force at break (in cN) by the linear density (in dtex).

EXAMPLES

The following polymers were used in the examples

VL4470 is a high density ethylene polymer, which is commercially available from Borealis Polyolefine GmbH, Austria. It has a density of 947 kg/m3, an MFR (190° C., 2.16 kg) of 0.60 g/10 min. VL4470 is a copolymer of ethylene with 1-hexene, produced with a Ziegler/Natta catalyst. Mw/Mn=4.

HB315BF is a propylene homopolymer copolymer, which is commercially available from Borealis Polyolefine GmbH, Austria. MFR (230° C., 2.16 kg) is 2.3 g/10 min.

RB307MO is a propylene random copolymer, which is commercially available from Borealis Polyolefine GmbH, Austria. MFR (230° C., 2.16 kg) is 1.5 g/10 min. Ethylene content is 4.8 wt %.

SA233CF is a random heterophasic propylene-ethylene copolymer (RAHECO commercially available from Borealis Polyolefine GmbH, Austria. The polymer has an MFR (230° C./2.16 kg) of 0.8 g/10 min, a density of 905 kg/m$^3$ and an XS content of 28 wt %. It has an ethylene content of 15.5 wt %.

Sample Preparation

The stretch tape samples were prepared by using a state of the art pilot cast film stretch tape line. The extruder was equipped with a metering pump to ensure a constant output. Before film extrusion, the polymers were dry blended in the desired ratios. The water quenching tank, godets and oven used were Reifenhäuser components. The temperature profile of the extruder used was 225° C., 230° C. and 235° C. The die was kept at 235° C. The film die had a 0.1 mm gap width. A 75 μm primary film was extruded into a water quench (30° C.) water bath. The take-off speed of the first godet roll was kept at 10 m/min. Tapes were slit and stretched in a hot air stretching oven with the below indicated stretch ratios, i.e. draw ratios. Annealing was done on the third godet stand. The three rolls of this godet were kept on a temperature of 90, 100 and 100° C.

Figure 2:
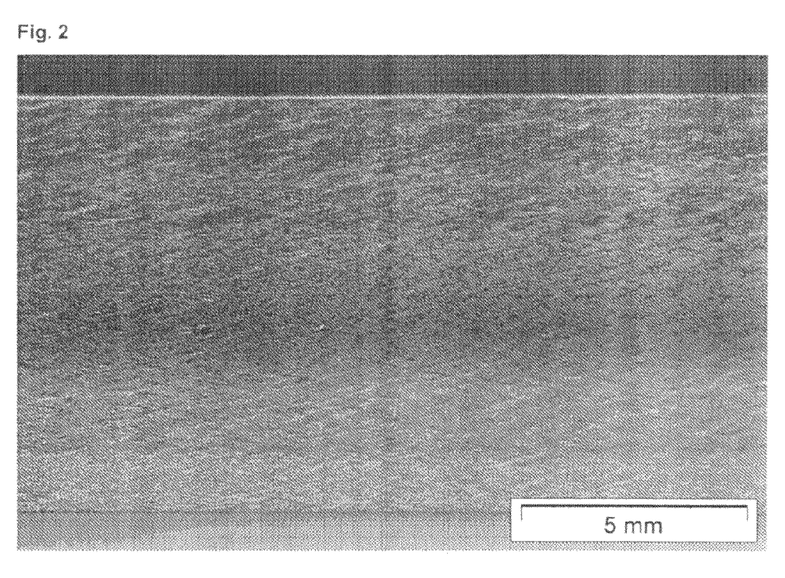
Figure 3:
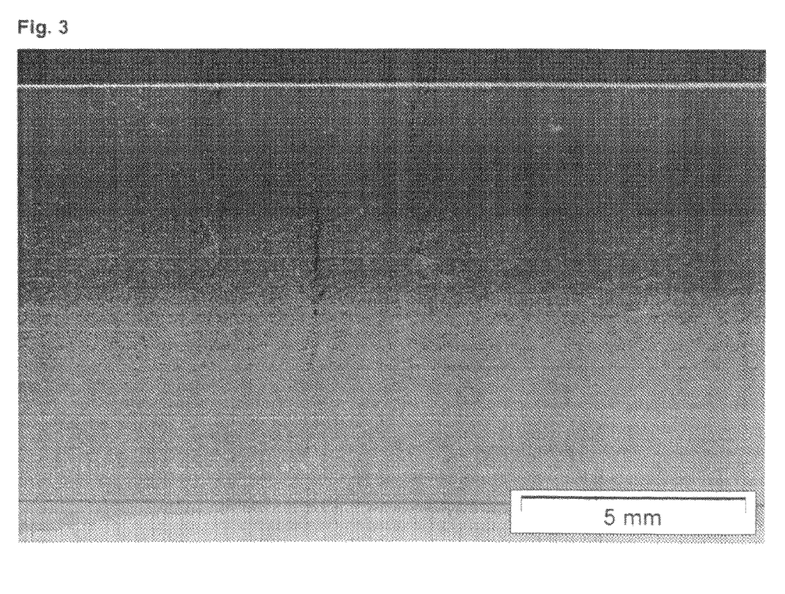
Figure 4:
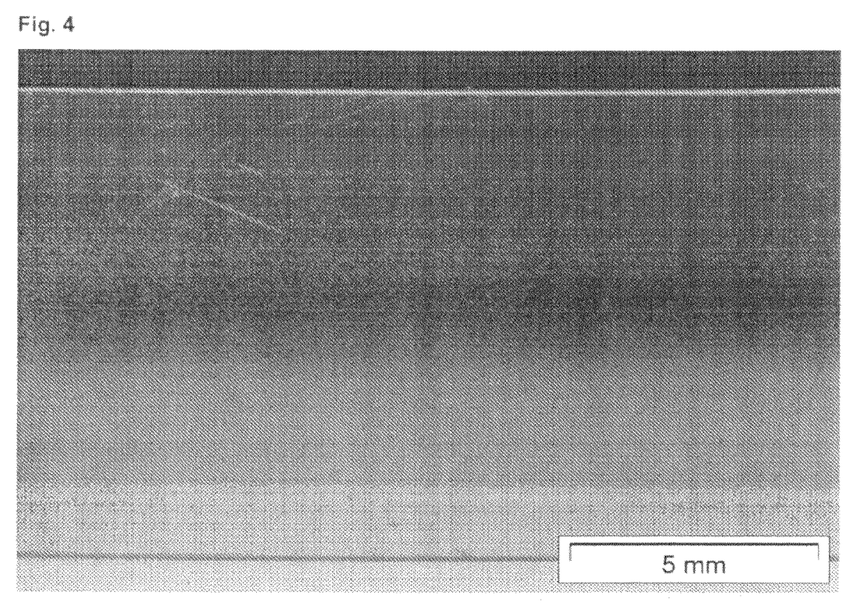

Selected film samples (slit tapes, unstretched) were examined under the light microscope and pictures taken therefrom are included as FIG. 2-4. The pictures were taken with a Nikon D70 with a 60 mm AF Micro Nikkor.

FIG. 2: VL4470+10% HB315BF

FIG. 3: VL4470+10% RB307MO

FIG. 4: VL4470+10% SA233CF

FIG. 2-4 demonstrate, that films which are produced from blends of HDPE and propylene homopolymer show an unsatisfactory and inhomogeneous surface.

Three test sample series with different draw ratios were prepared for each tested material:

$1^{st}$. Fibre sample series: tape samples were drawn 7 times their original length (draw ratio of 1:7) and $2^{nd}$. Fibre sample series: tape samples were drawn 8 times their original length (draw ratio of 1:8), $3^{rd}$. Fibre sample series: tape samples were drawn 9 times their original length (draw ratio of 1:9), unless otherwise stated.

The mechanical properties were tested according to the methods described above. The results of these tests are shown in tables 1-3.

TABLE 1

| Parameter | Unit | 1 | | | 2 | | | 3 | | |
|---|---|---|---|---|---|---|---|---|---|---|
| Stretch ratio | | 7 | 8 | 9 | 7 | 8 | 9 | 7 | 8 | 9 |
| | | 10% HB315BF | | | 20% HB315BF | | | 10% SA233CF | | |
| ELONGATION AT BREAK | % | 22.5 | 13.3 | 12.1 | 14.2 | 13.5 | 13.0 | 27.7 | 13.7 | 12.3 |
| TENACITY (at break) | cN/dtex | 4.5 | 5.6 | 6.6 | 4.2 | 5.6 | 6.6 | 4.5 | 5.5 | 7.3 |

TABLE 2

| | Unit | 4 | | | 5 | | | 6 | | |
|---|---|---|---|---|---|---|---|---|---|---|
| Stretch ratio | | 7 | 8 | 9 | 7 | 8 | 9 | 7 | 8 | 9 |
| | | 5% RB307MO | | | 10% RB307MO | | | 20% RB307MO | | |
| ELONGATION AT BREAK | % | 20.9 | 13.3 | 12.6 | 23.2 | 13.6 | 12.7 | 21.4 | 14.2 | 12.9 |
| TENACITY (at break) | cN/dtex | 4.5 | 5.8 | 7.0 | 4.7 | 5.8 | 7.2 | 4.5 | 5.7 | 6.7 |

TABLE 3

| Parameter | Unit | 7 | | |
|---|---|---|---|---|
| Stretch ratio | | 7 | 8 | 8.5 |
| | | | 100% VL4470 | |
| ELONGATION AT BREAK | % | 18.0 | 11.9 | 12.3 |
| TENACITY (at break) | cN/dtex | 4.7 | 6.0 | 6.5 |

Figure 1:
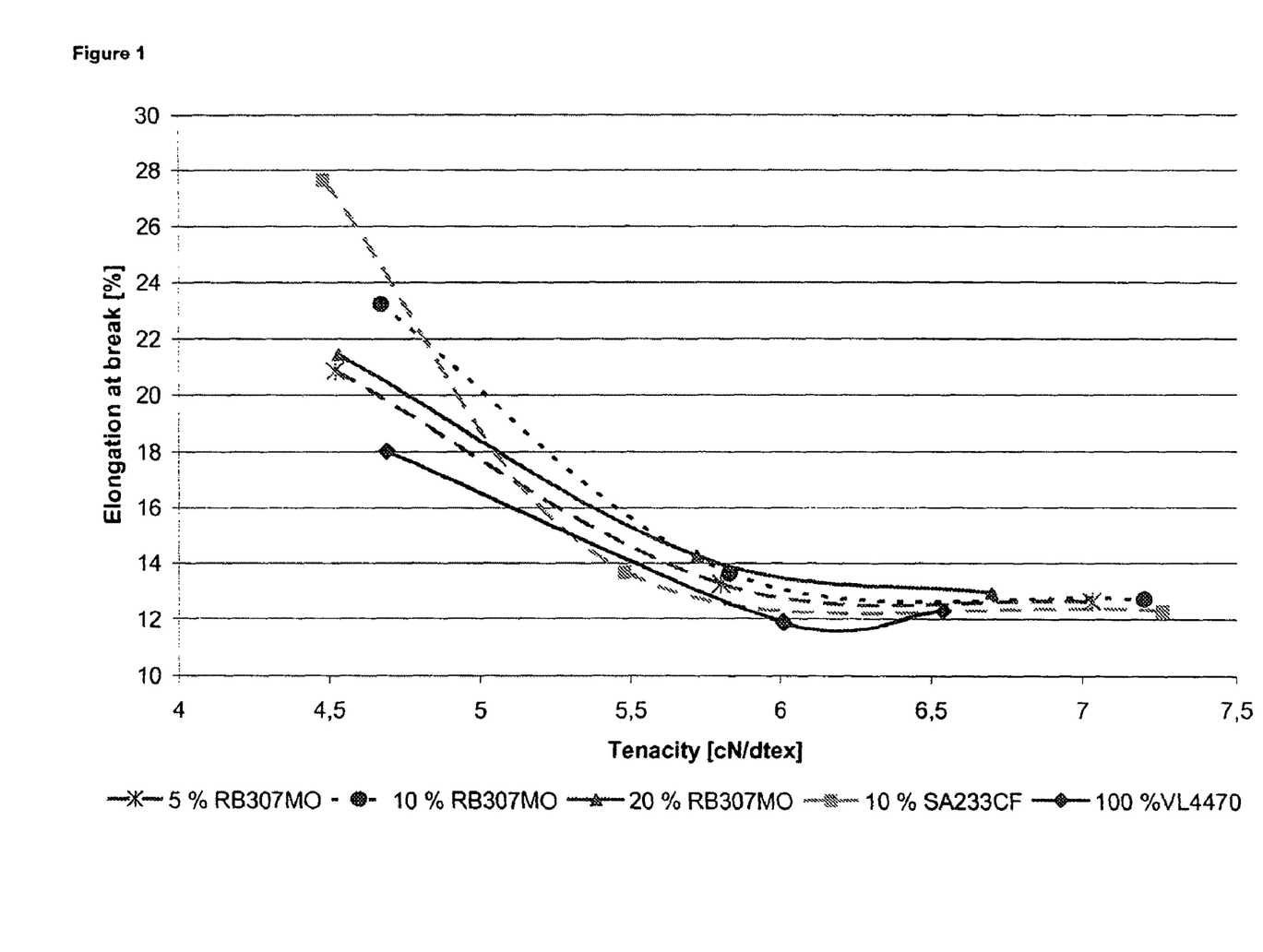

FIG. 1 shows a comparison of the elongation/tenacity relations for the basic high density polyethylene and the blends of the invention.

We claim:

1. A polyolefin composition comprising
   A) 2-30 wt % of a propylene copolymer which comprises a
      a) random propylene copolymer having a content of ethylene and/or $C_4$-$C_8$ α-olefin of 0.5 to 12 wt % and optionally an
      b) ethylene-α-olefin rubber,
   B) 70-98 wt % of a high density polyethylene having a density of 930 to 965 kg/m$^3$ and a MFR (190° C./2.16 kg) of 0.3 to 20 g/10 min.

2. A polyolefin composition according to claim 1 wherein the random propylene copolymer has a content of ethylene and/or $C_4$-$C_8$ α-olefin of 0.5 to 12 wt %.

3. A polyolefin composition according to claim 1, wherein a comonomer in the random propylene copolymer is ethylene.

4. A polyolefin composition according to claim 1, wherein the propylene copolymer comprises an ethylene-α-olefin rubber, wherein the α-olefin is propylene.

5. A polyolefin composition according to claim 1, wherein the propylene copolymer comprises an ethylene-α-olefin rubber and that the propylene copolymer has a XS content of 15-50 wt %.

6. A polyolefin composition according to claim 1, wherein the propylene copolymer comprises an ethylene-α-olefin rubber and that the propylene copolymer has an ethylene content of from 6 to 30 wt %.

7. A polyolefin composition according to claim 1, wherein the propylene copolymer has an MFR (230° C., 2.16 kg) of 0.5 to 10 g/10 min.

8. A polyolefin composition according to claim 1, wherein the high density polyethylene is a homopolymer or a copolymer of ethylene and $C_3$-$C_{20}$ α-olefins.

9. A polyolefin composition according to claim 1, wherein the high density polyethylene has a density of 935 to 955 kg/m$^3$.

10. A polyolefin composition according to claim 1, wherein the high density polyethylene has a MFR (190° C./2.16 kg) of 0.2 to 15 g/10 min.

11. A polyolefin composition according to claim 1, wherein the high density polyethylene is obtained by polymerising ethylene and optionally one or more $C_3$-$C_8$ α-olefins in the presence of a Ziegler/Natta catalyst.

12. A polyolefin composition according to claim 1, wherein the high density polyethylene has a molecular weight distribution (MWD) $M_w/M_n$ of $\geq 2$.

13. A polyolefin composition according to claim 1, which is formed into a drawn tape, fibre or filament.

14. A polyolefin composition according to claim 12, wherein the tape, fibre or filament has been drawn to at least 4 times its original length, preferably 6 to 10 times its original length.

15. A polyolefin composition according to claim 1, which is formed into an oriented film.

16. A polyolefin composition according to claim 15, wherein the orientated film is oriented in machine direction only.

* * * * *

UNITED STATES PATENT AND TRADEMARK OFFICE
CERTIFICATE OF CORRECTION

PATENT NO. : 8,138,267 B2
APPLICATION NO. : 12/733085
DATED : March 20, 2012
INVENTOR(S) : Henk Van Paridon et al.

It is certified that error appears in the above-identified patent and that said Letters Patent is hereby corrected as shown below:

Column 5,
Line 3, "(TEN)" should be -- (TEAI) --.

Column 12,
Line 29, Claim 7, "(230°C, 2.16 kg)" should be -- (230°C/2.16kg) --.

Signed and Sealed this
Second Day of April, 2013

Teresa Stanek Rea
*Acting Director of the United States Patent and Trademark Office*